US011996045B2

(12) United States Patent
Kim et al.

(10) Patent No.: US 11,996,045 B2
(45) Date of Patent: May 28, 2024

(54) PIXEL

(71) Applicant: Samsung Display Co., Ltd., Yongin-si (KR)

(72) Inventors: Junehwan Kim, Yongin-si (KR); Yoonho Kim, Yongin-si (KR); Taeyoung Kim, Yongin-si (KR); Jongwoo Park, Yongin-si (KR); Daeyoun Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/094,926

(22) Filed: Jan. 9, 2023

(65) Prior Publication Data

US 2023/0230545 A1 Jul. 20, 2023

(30) Foreign Application Priority Data

Jan. 14, 2022 (KR) ........................ 10-2022-0006180

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/0262* (2013.01); *G09G 2310/08* (2013.01); *G09G 2320/0626* (2013.01)

(58) Field of Classification Search
CPC ............................ G09G 3/3233; G09G 3/3258
See application file for complete search history.

(56) References Cited

U.S. PATENT DOCUMENTS

| | | | | |
|---|---|---|---|---|
| 10,825,394 | B2 | 11/2020 | Kim et al. | |
| 11,238,784 | B1 * | 2/2022 | Zhou | G09G 3/3233 |
| 2013/0272069 | A1 | 10/2013 | Rabkin et al. | |
| 2016/0247836 | A1 | 8/2016 | Lv et al. | |
| 2018/0240855 | A1 | 8/2018 | Lee et al. | |
| 2020/0161400 | A1 | 5/2020 | Ka et al. | |
| 2021/0056902 | A1 * | 2/2021 | Tanaka | G09G 3/3291 |
| 2021/0335230 | A1 * | 10/2021 | Ma | G09G 3/3233 |
| 2021/0359058 | A1 * | 11/2021 | Cho | H01L 29/78696 |

FOREIGN PATENT DOCUMENTS

| | | | |
|---|---|---|---|
| JP | 2012-133165 | A | 7/2012 |
| KR | 10-2017-0080147 | A | 7/2017 |
| KR | 10-2020-0060588 | A | 6/2020 |
| KR | 10-2020-0111873 | A | 10/2020 |

* cited by examiner

*Primary Examiner* — Sardis F Azongha
(74) *Attorney, Agent, or Firm* — Lewis Roca Rothgerber Christie LLP

(57) ABSTRACT

A pixel includes: a first driving transistor and a second driving transistor; a first select transistor connected between a gate of the first driving transistor and a gate node; and a second select transistor connected between a gate of the second driving transistor and the gate node.

20 Claims, 13 Drawing Sheets

PIXEL

CROSS-REFERENCE TO RELATED APPLICATION

The present application claims priority to and the benefit of Korean Patent Application No. 10-2022-0006180, filed on Jan. 14, 2022, in the Korean Intellectual Property Office, the entire disclosure of which is incorporated herein by reference.

BACKGROUND

1. Field

Aspects of one or more embodiments relate to pixels and display apparatus.

2. Description of the Related Art

Organic light-emitting display apparatuses include display elements, for example, organic light-emitting diodes, having brightness that varies depending on variations in current. A pixel of an organic light-emitting display apparatus generally includes a display element, a driving transistor that controls an amount of current supplied to the display element according to the voltage between a gate and a source, and a switching transistor that transmits a data signal to control the brightness of the display element to the driving transistor.

The above information disclosed in this Background section is only for enhancement of understanding of the background and therefore the information discussed in this Background section does not necessarily constitute prior art.

SUMMARY

Aspects of one or more embodiments include pixels and display apparatuses capable of displaying images with relatively high brightness. The characteristics of embodiments according to the present disclosure are not limited to the above-described characteristics, and other technical characteristics that are not mentioned herein would be clearly understood by a person skilled in the art from the description of embodiments according to the present invention.

Additional aspects of some embodiments will be set forth in part in the description which follows and, in part, will be apparent from the description, or may be learned by practice of the presented embodiments of the present disclosure.

According to some embodiments of the present disclosure, a pixel includes a first transistor including a first driving transistor and a second driving transistor, a second transistor connected between a data line and a first node, a third transistor connected between a second node and a third node, a fourth transistor connected between the second node and a first voltage line, a fifth transistor connected between a second voltage line and the first node, a sixth transistor connected between the third node and an organic light-emitting diode, a capacitor connected between the second voltage line and the second node, a first select transistor connected between a gate of the first driving transistor and the second node, and a second select transistor connected between a gate of the second driving transistor and the second node.

According to some embodiments, a channel length of the first driving transistor may be shorter than a channel length of the second driving transistor.

According to some embodiments, in a high brightness display mode, in an emission period, the first select transistor may be turned on, and the second select transistor may be turned off.

According to some embodiments, in a low brightness display mode, in an emission period, the second select transistor may be turned on, and the first select transistor may be turned off.

According to some embodiments, one frame may include a non-emission period and an emission period, the fourth transistor may be turned on in a first duration of the non-emission period, the second transistor and the third transistor may be turned on in a second period subsequent to the first duration of the non-emission period, and the fifth transistor and the sixth transistor may be turned on in the emission period.

According to some embodiments, the first select transistor may be turned on, or the second select transistor may be turned on in the second period and the emission period, according to a brightness of an image to be displayed.

According to some embodiments, the pixel may further include a seventh transistor connected between a third voltage line and the organic light-emitting diode, wherein the seventh transistor may be turned on in a third duration of the non-emission period, and the third duration is one of a duration before the first duration, a duration between the first duration and the second period, and a duration between the second period and the emission period.

According to some embodiments of the present disclosure, a pixel includes a first transistor including a first driving transistor and a second driving transistor, a second transistor connected between a data line and a first node, a third transistor connected between a second node and a third node, a fourth transistor connected between the second node and a first voltage line, a fifth transistor connected between a second voltage line and the first node, a sixth transistor connected between the third node and an organic light-emitting diode, a capacitor connected between the second voltage line and the second node, a first select transistor connected between a gate of the first driving transistor and the second node, and a second select transistor connected between a gate of the second driving transistor and the second node.

According to some embodiments, a channel length of the first driving transistor may be shorter than a channel length of the second driving transistor.

According to some embodiments, one frame may include a non-emission period and an emission period, the fourth transistor may be turned on in a first duration of the non-emission period, the second transistor and the third transistor may be turned on in a second period subsequent to the first duration of the non-emission period, and the fifth transistor and the sixth transistor may be turned on in the emission period.

According to some embodiments, the first select transistor and the second select transistor may be turned on in the second period and the emission period, and in the emission period, a voltage level of a first selection signal applied to the gate of the first select transistor may be different from a voltage level of a second selection signal applied to the gate of the second select transistor.

According to some embodiments, in a high brightness display mode, in the emission period, the second selection signal may have a voltage level to apply a voltage to the gate of the second driving transistor, the voltage enabling the second driving transistor to perform a switching function, and the first selection signal may have a voltage level to apply a voltage to the gate of the first driving transistor, the voltage enabling the first driving transistor to output a driving current corresponding to a data signal.

According to some embodiments, in a low brightness display mode, in the emission period, the first selection signal may have a voltage level to apply a voltage to the gate of the first driving transistor, the voltage enabling the first driving transistor to perform a switching function, and the second selection signal may have a voltage level to apply a voltage to the gate of the second driving transistor, the voltage enabling the second driving transistor to output a driving current corresponding to a data signal.

According to some embodiments, the pixel may further include a seventh transistor connected between a third voltage line and the organic light-emitting diode, wherein the seventh transistor may be turned on in a third duration of the non-emission period, and the third duration is one of a duration before the first duration, a duration between the first duration and the second period, and a duration between the second period and the emission period.

According to some embodiments of the present disclosure, a pixel includes a first transistor including a first driving transistor and a second driving transistor that are connected in series between a first voltage line and a third node, a second transistor connected between a data line and a first node that is a middle node of the first driving transistor and the second driving transistor, a third transistor connected between a second node and the third node, a fourth transistor connected between the second node and a second voltage line, a fifth transistor connected between the third node and an organic light-emitting diode, a capacitor connected between the first voltage line and the second node, a first select transistor connected between a gate of the first driving transistor and the second node, and a second select transistor connected between a gate of the second driving transistor and the second node.

According to some embodiments, a channel length of the first driving transistor may be shorter than a channel length of the second driving transistor.

According to some embodiments, one frame may include a non-emission period and an emission period, the fourth transistor may be turned on in a first duration of the non-emission period, the second transistor and the third transistor may be turned on in a second period subsequent to the first duration of the non-emission period, and the fifth transistor may be turned on in the emission period.

According to some embodiments, in the second period, the first select transistor may be turned off and the second select transistor may be turned on, in the emission period, the first select transistor and the second select transistor may be turned on, and in the emission period, a voltage level of a first selection signal applied to the gate of the first select transistor may be different from a voltage level of a second selection signal applied to the gate of the second select transistor.

According to some embodiments, in a high brightness display mode, in the emission period, the second selection signal may have a voltage level to apply a voltage to the gate of the second driving transistor, the voltage enabling the second driving transistor to perform a switching function, and the first selection signal may have a voltage level to apply a voltage to the gate of the first driving transistor, the voltage enabling the first driving transistor to output a driving current corresponding to a data signal.

According to some embodiments, in a low brightness display mode, in the emission period, the first selection signal may have a voltage level to apply a voltage to the gate of the first driving transistor, the voltage enabling the first driving transistor to perform a switching function, and the second selection signal may have a voltage level to apply a voltage to the gate of the second driving transistor, the voltage enabling the second driving transistor to output a driving current corresponding to a data signal.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
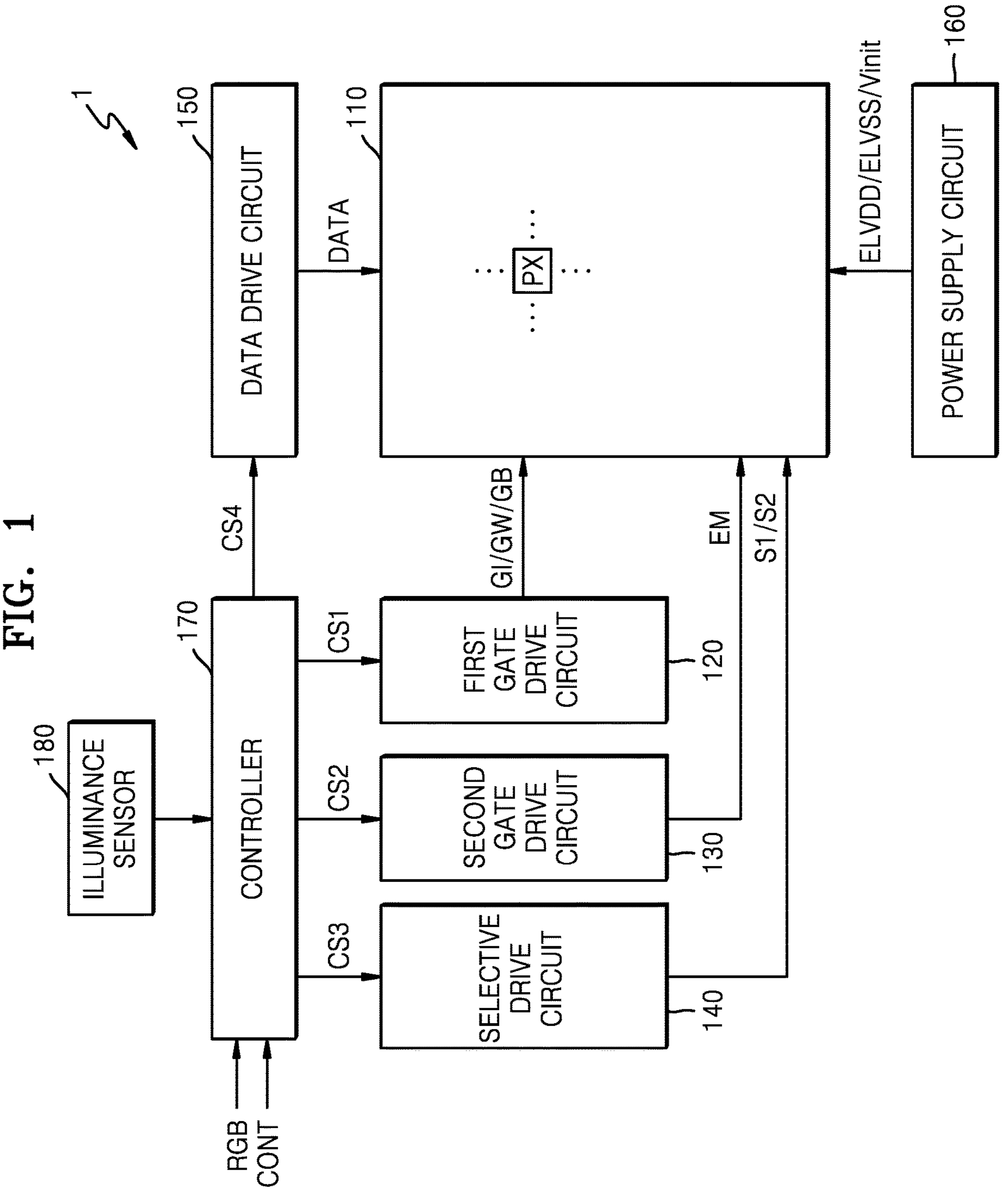
FIG. 1 is a schematic block diagram of a display apparatus according to some embodiments.

Reference will now be made in more detail to aspects of some embodiments, which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

Various modifications may be applied to the present embodiments, and particular embodiments will be illustrated in the drawings and described in the detailed description section. The effect and features of the present embodiments, and a method to achieve the same, will be clearer referring to the detailed descriptions below with the drawings. However, the present embodiments may be implemented in various forms, not by being limited to the embodiments presented below.

In the embodiments below, it will be understood that although the terms "first," "second," etc. may be used herein to describe various elements, these elements should not be limited by these terms. These terms are only used to distinguish one element from another.

In the embodiments below, the singular forms are intended to include the plural forms as well, unless the context clearly indicates otherwise.

In the embodiments below, it will be further understood that the terms "comprises" and/or "comprising" used herein specify the presence of stated features or elements, but do not preclude the presence or addition of one or more other features or elements.

It will be understood that when a layer, region, or element is referred to as being "formed on" another layer, region, or element, it can be directly or indirectly formed on the other layer, region, or element. That is, for example, intervening layers, regions, or elements may be present.

Sizes of elements in the drawings may be exaggerated for convenience of explanation. For example, because sizes and thicknesses of elements in the drawings are arbitrarily illustrated for convenience of explanation, the following embodiments are not limited thereto.

In the specification, the expression such as "A and/or B" may include A, B, or A and B. Furthermore, the expression such as "at least one of A and B" may include A, B, or A and B.

In the following embodiments, the meaning that the wiring "extends in the first direction or the second direction" includes not only extending in a linear shape, but also extending in a zigzag or a curve along the first direction or the second direction.

In the following embodiments, when X and Y are connected to each other, it may include a case in which X and Y are electrically connected, a case in which X and Y are functionally connected, and a case in which X and Y are directly connected. Here, X and Y may be objects, for example, apparatuses, devices, circuits, wirings, electrodes, terminals, conductive films, layers, etc. Accordingly, a certain connection relationship, for example, is not limited to the connection relationship described in the drawings or detailed descriptions, and may include things other than the connection relationship described in the drawings or detailed descriptions.

A case in which X and Y are electrically connected to each other may include, for example, a case in which one or more elements, for example, switches, transistors, capacitors, inductors, resistors, diodes, etc., which enable the electric connection between X and Y, is connected between X and Y.

In the following embodiments, the term "ON" used in connection with a device state may refer to an activated state of the device, and the term "OFF" may refer to an inactive state of the device. The term "On" used in connection with a signal received by a device may refer to a signal that activates the device, and the term "OFF" may refer to a signal that deactivates the device. A device can be activated by a high level voltage or a low level voltage. For example, a P-channel transistor is activated by a low level voltage, and an N-channel transistor is activated by a high level voltage. Accordingly, it should be understood that the "ON" voltages for a P-channel transistor and an N-channel transistor are at opposite (low vs. high) voltage levels.

FIG. 1 is a schematic block diagram of a display apparatus 1 according to some embodiments.

Referring to FIG. 1, the display apparatus 1 according to some embodiments may include a pixel unit 110, a first gate drive circuit 120, a second gate drive circuit 130, a selective drive circuit 140, a data drive circuit 150, a power supply circuit 160, and a controller 170.

A plurality of pixels PX may be arranged in the pixel unit 110. The pixels PX may be arranged in various forms such as a stripe arrangement, a Pentile® arrangement, a mosaic arrangement, and the like, to thereby implement or display an image. The pixel unit 110 may be located a display area of a substrate. Each pixel PX may include an organic light-emitting diode OLED as a display element, and the organic light-emitting diode OLED may be connected to the pixel unit 110. Each pixel PX may emit, for example, red, green, blue, or white light through the organic light-emitting diode OLED.

A plurality of first gate lines, second gate lines, third gate lines, and fourth gate lines may be arranged in the pixel unit 110 in rows regularly apart from each other. Each of the first gate lines, the second gate lines, the third gate lines, and the fourth gate lines may extend in a first direction, for example, a row direction, and may be connected to the pixels PX located on the same row. Each of the first gate lines may transmit a first gate signal GW to the pixels PX on the same row. Each of the second gate lines may transmit a second gate signal GI to the pixels PX on the same row. Each of the third gate lines may transmit a third gate signal GB to the pixels PX on the same row. Each of the fourth gate lines may transmit a fourth gate signal EM to the pixels PX on the same row. A plurality of first selection lines and second selection lines may be arranged in the pixel unit 110 in a row direction or a column direction, for each row. A first selection signal S1 may be transmitted to the pixels PX on the same row through the first selection lines. A second selection signal S2 may be transmitted to the pixels PX on the same row through the second selection lines.

A plurality of data lines may be arranged in the pixel unit 110 in columns regularly spaced apart from each other. Each of the data lines may extend in a second direction, for example, a column direction, and may be connected to the pixels PX located in the same column. Each of the data lines may transmit a data signal DATA to the pixels PX in the same column.

The first gate drive circuit 120 may be connected to the first gate lines, the second gate lines, and the third gate lines of the pixel unit 110, and may apply, in response to a first control signal CS1, the first gate signal GW, the second gate signal GI, and the third gate signal GB to the first gate lines, the second gate lines and the third gate lines, respectively. When each of the first gate signal GW, the second gate signal GI, and the third gate signal GB has an ON voltage, a transistor connected to a corresponding gate line of the pixel PX is turned on.

The second gate drive circuit 130 may be connected to the fourth gate lines of the pixel unit 110, and may apply, in response to a second control signal CS2, the fourth gate signal EM to the fourth gate lines. When the fourth gate signal EM has an ON voltage, a transistor connected to the corresponding fourth gate line of the pixel PX is turned on.

The selective drive circuit 140 may be connected to the first selection lines and the second selection lines of the pixel unit 110, and may apply, in response to a third control signal CS3, the first selection signal S1 and/or the second selection signal S2 to the first selection lines and the second selection lines. When the first selection signal S1 and the second selection signal S2 each have an ON voltage, a transistor connected to the corresponding selection line of the pixel PX is turned on.

The data drive circuit 150 may be connected to the data lines of the pixel unit 110, and may apply, in response to a fourth control signal CS4, the data signal DATA representing a gradation to the data lines. The data drive circuit 150 may convert input image data having a gradation input from the controller 170 into a data signal in the form of a voltage or a current.

The power supply circuit 160 may generate voltages needed for driving of the pixel PX. For example, the power supply circuit 160 may generate a first driving voltage ELVDD, a second driving voltage ELVSS, a reference voltage VREF, and an initialization voltage Vinit. The power supply circuit 160 may apply the first driving voltage ELVDD, the second driving voltage ELVSS, and the initialization voltage Vinit to the pixels PX of the pixel unit 110.

The level of the first driving voltage ELVDD may be higher than the level of the second driving voltage ELVSS. The initialization voltage Vinit may be a voltage to turn off the organic light-emitting diode OLED. According to some embodiments, the level of the initialization voltage Vinit may be lower than the level of the second driving voltage ELVSS. According to some embodiments, the level of the initialization voltage Vinit may be higher than the level of the second driving voltage ELVSS, and a difference between the initialization voltage Vinit and the level of the second driving voltage ELVSS may be less than a threshold voltage needed for the display element of the pixel PX to emit light.

The controller 170 may control the pixel unit 110 by controlling the operation timing of the first gate drive circuit 120, the second gate drive circuit 130, the selective drive circuit 140, and the data drive circuit 150. The controller 170 may receive, from an external graphics controller, image data RGB and a control signal CONT to control the display thereof. The control signal CONT may include, for example, at least one of a vertical synchronous signal Vsync, a horizontal synchronous signal Hsync, a data enable signal DE, or a clock signal CLK. The controller 170 may generate, in response to the control signal CONT, the first to fourth control signals CS1, CS2, CS3, and CS4, and transmit the generated signals to the first gate drive circuit 120, the second gate drive circuit 130, the selective drive circuit 140, and the data drive circuit 150, respectively.

The controller 170 may determine a frame period by counting the data enable signal DE. In this case, the vertical synchronous signal Vsync and the horizontal synchronous signal Hsync that are externally provided may be omitted. The image data RGB may include brightness information of the pixels PX. The brightness may have a preset number, for example, 1024 ($=2^{10}$), 256 ($=2^8$) or 64 ($=2^6$) of gradations (gray).

The display apparatus 1 according to some embodiments may further include an illuminance sensor 180.

The illuminance sensor 180 may be included in the display apparatus 1 to sense external illuminance (brightness) around the display apparatus 1, and may transmit illuminance information (brightness information) to the controller 170.

The controller 170 may set a display mode to a high brightness mode (first mode) or a low brightness mode (second mode), based on one of the illuminance information, the brightness information of an input image, and a user input. According to some embodiments, the high brightness mode may be a mode for displaying an image at a brightness of 1000 nit or more, and the low brightness mode may be a mode for displaying an image at a brightness within a typical range of 650 nit to 850 nit.

The controller 170 may generate the third control signal CS3 to control the output timing of the first selection signal S1 and/or the second selection signal S2 according to a set display mode.

According to some embodiments, the controller 170 may generate and output the third control signal CS3 based on the illuminance information. The controller 170 may set the display mode to the high brightness mode when illuminance is a reference value or more, and the display mode to the low brightness mode when illuminance is less than the reference value. The controller 170 may generate the third control signal CS3 to control the output timing of the first selection signal S1 and/or the second selection signal S2, according to the high brightness mode or the low brightness mode.

According to some embodiments, the controller 170 may generate and output the third control signal CS3, based on the brightness information of an input image. The controller 170 may set the display mode to the high brightness mode when the brightness of an image is the reference value or more, and the display mode to the low brightness mode when the brightness of an image is less than the reference value. The brightness of an image may be an average brightness of the entire image. The controller 170 may generate the third control signal CS3 to control the output timing of the first selection signal S1 and/or the second selection signal S2 according to the high brightness mode or the low brightness mode.

According to some embodiments, the controller 170 may generate and output the third control signal CS3 in response to the setting of a display mode according to a user input. When the high brightness mode or the low brightness mode is set according to the user input, the controller 170 may generate the third control signal CS3 to control the output timing of the first selection signal S1 and/or the second selection signal S2 according to the high brightness mode or the low brightness mode.

Although FIG. 1 illustrates the first gate drive circuit 120 and the second gate drive circuit 130 to be separate from each other, according to some embodiments, the first gate drive circuit 120 and the second gate drive circuit 130 may be implemented as one gate drive circuit to output the first gate signal GW, the second gate signal GI, the third gate signal GB, and the fourth gate signal EM.

Each of the first gate drive circuit 120, the second gate drive circuit 130, the selective drive circuit 140, the data drive circuit 150, the power supply circuit 160, and the controller 170 may be formed in the form of separate integrated circuit chips or one integrated circuit chip to be mounted directly on the substrate where the pixel unit 110 is formed, mounted on a flexible printed circuit film, attached on the substrate in the form of a tape carrier package (TCP), or formed directly on the substrate.

Figure 2:
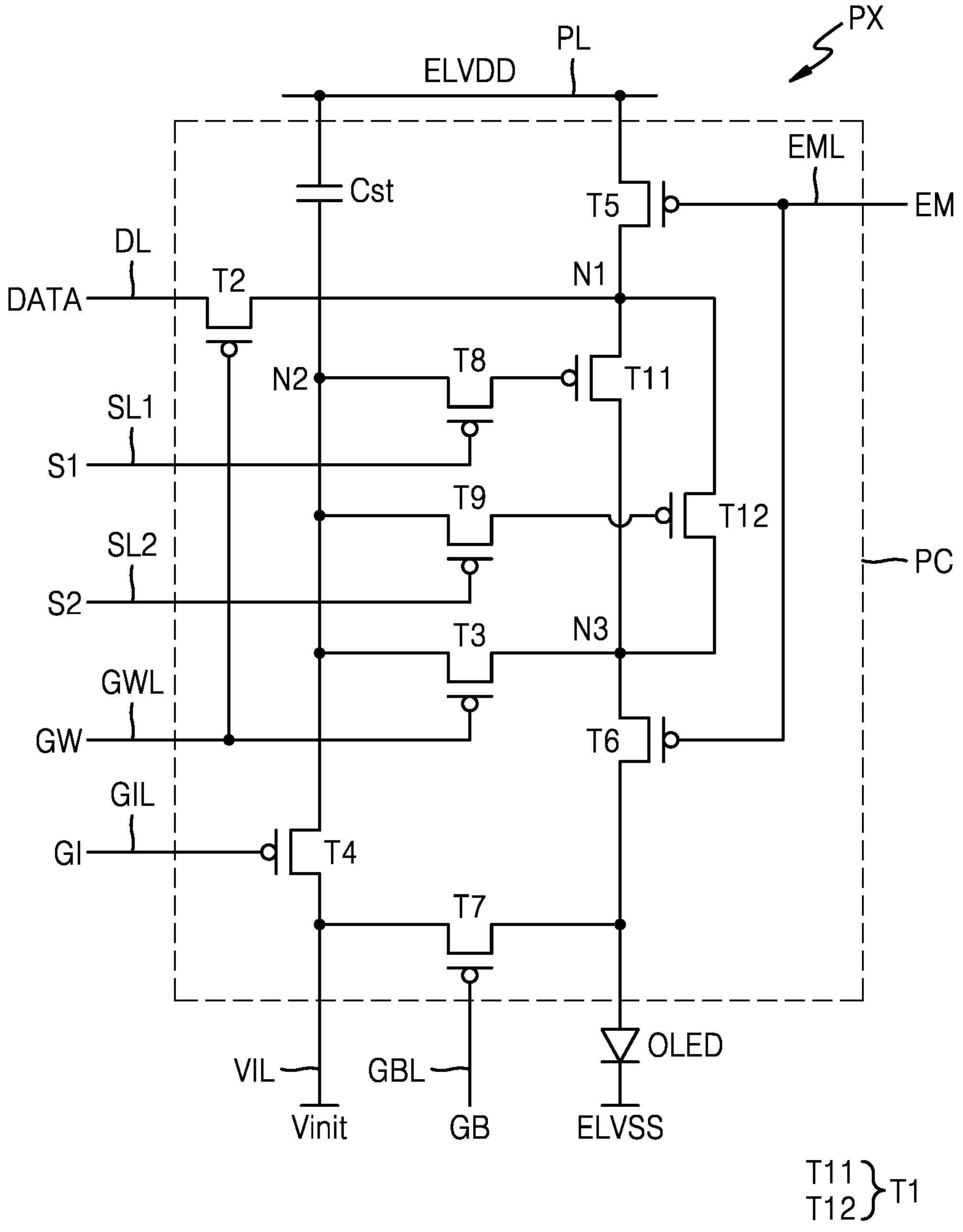
FIG. 2 is a pixel circuit of a pixel according to some embodiments.

FIG. 2 is a pixel circuit of a pixel according to some embodiments.

Referring to FIG. 2, the pixel PX may include the organic light-emitting diode OLED as a display element and a pixel circuit PC connected to the organic light-emitting diode OLED. The pixel circuit PC may include first to ninth transistors T1 to T9 and a capacitor C. The first transistor T1 may be a driving transistor, and the second to ninth transistors T2 to T9 may be switching transistors. The first to ninth transistors T1 to T9 may be implemented as thin film transistors. According to the type (p-type or n-type) and/or operation condition of a transistor, a first terminal of each of the first to ninth transistors T1 to T9 may be a source or a drain, and a second terminal thereof may be a terminal different from the first terminal. For example, when the first terminal is a source, the second terminal may be a drain.

The pixel PX may be connected to a first gate line GWL through which the first gate signal GW is transmitted, a second gate line GIL through which the second gate signal GI is transmitted, a third gate line GBL through which the third gate signal GB is transmitted, a fourth gate line EML through which the fourth gate signal EM is transmitted, and a data line DL through which the data signal DATA is transmitted. The pixel PX may be connected to a first selection line SL1 through which the first selection signal S1 is transmitted and a second selection line SL2 through which the second selection signal S2 is transmitted. A driving voltage line PL may be configured to transmit the first driving voltage ELVDD to the first transistor T1. An initialization voltage line VIL may be configured to transmit the initialization voltage Vinit to a gate of the first transistor T1 and the organic light-emitting diode OLED.

The first transistor T1 may be connected between the driving voltage line PL and the organic light-emitting diode OLED. The first transistor T1 may be connected between a first node N1 and a third node N3. The first transistor T1 may include a first driving transistor T11 and a second driving transistor T12 that are connected in parallel to each other. Each of the first driving transistor T11 and the second driving transistor T12 may output a source-drain current, that is, a driving current, according to a gate-source voltage (hereinafter, referred to as the "gate voltage" of a driving transistor).

The first driving transistor T11 may include a first terminal connected to the first node N1, and a second terminal connected to the third node N3. A gate of the first driving transistor T11 may be connected to a second node N2 via the eighth transistor T8. The second driving transistor T12 may include a first terminal connected to the first node N1, and a second terminal connected to the third node N3. A gate of the second driving transistor T12 may be connected to the second node N2 via the ninth transistor T9. The first node N1 may be a node to which the first transistor T1 and the fifth transistor T5 are connected. The first node N1 may be a node to which the first terminal of the first transistor T1 and the second terminal of the fifth transistor T5 are connected. The second node N2 may be a node (gate node) to which the gate of the first driving transistor T11 and the gate of the second driving transistor T12 are connected via the eighth transistor T8 and the ninth transistor T9, respectively. The third node N3 may be a node to which the first transistor T1 and the sixth transistor T6 are connected. The third node N3 may be a node to which the second terminal of the first transistor T1 and the first terminal of the sixth transistor T6 are connected. The channel length of the second driving transistor T12 may be greater than the channel length of the first driving transistor T11.

The first terminals of the first driving transistor T11 and the second driving transistor T12 may be connected to the driving voltage line PL via the fifth transistor T5, and the second terminals thereof may be connected to a pixel electrode of the organic light-emitting diode OLED via the sixth transistor T6. Each of the first driving transistor T11 and the second driving transistor T12 may receive the data signal DATA according to the switching operation of the second transistor T2 and control an amount of current of the driving current flowing toward the organic light-emitting diode OLED. The first terminals of the first driving transistor T11 and the second driving transistor T12 may be sources, and each of the first driving transistor T11 and the second driving transistor T12 may output a driving current according to the gate voltage. In the high brightness mode, the driving current may be output through the first driving transistor T11 having a short channel length. In the low brightness mode, the driving current may be output through the second driving transistor T12 having a long channel length.

The second transistor T2 (data write transistor) may be connected between the data line DL and the first node N1, and connected to the driving voltage line PL via the fifth transistor T5. The second transistor T2 may include the gate connected to the first gate line GWL, the first terminal connected to the data line DL, and the second terminal connected to the first node N1. The second transistor T2 may be turned on in response to the first gate signal GW received through the first gate line GWL and may perform a switching operation of transmitting the data signal DATA transmitted through the data line DL to the first node N1.

The third transistor T3 (compensation transistor) may be connected between the second node N2 and the third node N3. The third transistor T3 may be connected to the organic light-emitting diode OLED via the sixth transistor T6. The third transistor T3 may include the gate connected to the first gate line GWL, the first terminal connected to the second node N2, and the second terminal connected to the third node N3. The third transistor T3 may be turned on in response to the first gate signal GW received through the first gate line GWL to have the first driving transistor T11 or the second driving transistor T12 form a diode-connection, thereby compensating the threshold voltage of the first driving transistor T11 or the second driving transistor T12.

The fourth transistor T4 (first initialization transistor) may be connected between the second node N2 and the initialization voltage line VIL. The fourth transistor T4 may include the gate connected to the second gate line GIL, the first terminal connected to the second node N2, and the second terminal connected to the initialization voltage line VIL. The fourth transistor T4 may be turned on in response to the second gate signal GI received through the second gate line GIL to transmit the initialization voltage Vinit to the gate of the first transistor T1, thereby initializing the gate of the first transistor T1.

The fifth transistor T5 (first emission control transistor) may be connected between the driving voltage line PL and the first node N1. The sixth transistor T6 (second emission control transistor) may be connected between the third node N3 and the organic light-emitting diode OLED. The fifth transistor T5 may include the gate connected to the fourth gate line EML, the first terminal connected to the driving voltage line PL, and the second terminal connected to the first node N1. The sixth transistor T6 may include the gate connected to the fourth gate line EML, the first terminal connected to the third node N3, and the second terminal connected to the pixel electrode of the organic light-emitting diode OLED. The fifth transistor T5 and the sixth transistor T6 are simultaneously (or concurrently) turned on in response to the fourth gate signal EM received through the fourth gate line EML, and thus, the driving current may flow in the organic light-emitting diode OLED.

The seventh transistor T7 (second initialization transistor) may be connected between the organic light-emitting diode OLED and the initialization voltage line VIL. The seventh transistor T7 may include the gate connected to the third gate line GBL, the first terminal connected to the second terminal of the sixth transistor T6 and the pixel electrode of the organic light-emitting diode OLED, and the second terminal connected to the initialization voltage line VIL. The seventh transistor T7 may be turned on in response to the third gate signal GB received through the third gate line GBL to transmit the initialization voltage Vinit to the pixel electrode of the organic light-emitting diode OLED, thereby initializing the pixel electrode of the organic light-emitting diode OLED.

The eighth transistor T8 (first select transistor) may be connected between the gate of the first driving transistor T11 and the second node N2. The eighth transistor T8 may include the gate connected to the first selection line SL1, the first terminal connected to the second node N2, and the second terminal connected to the gate of the first driving transistor T11. The eighth transistor T8 may be turned on in response to the first selection signal S1 received through the first selection line SL1, thereby controlling the turn-on of the first driving transistor T11.

The ninth transistor T9 (second select transistor) may be connected between the gate of the second driving transistor T12 and the second node N2. The ninth transistor T9 may include the gate connected to the second selection line SL2, the first terminal connected to the second node N2, and the second terminal connected to the gate of the second driving transistor T12. The ninth transistor T9 may be turned on in response to the second selection signal S2 received through the second selection line SL2, thereby controlling the turn-on of the second driving transistor T12.

A capacitor Cst may include a first electrode connected to the driving voltage line PL and a second electrode connected to the second node N2. The capacitor Cst may maintain the voltage of the gate of the first transistor T1 by storing and maintaining a voltage corresponding to a difference between the voltages supplied to both ends of the first electrode and the second electrode of the capacitor Cst.

The organic light-emitting diode OLED may include a pixel electrode, for example, an anode, and a counter electrode, for example, a cathode, facing the pixel electrode, and the counter electrode may receive the common voltage ELVSS. The organic light-emitting diode OLED may receive a current corresponding to a voltage value stored in the capacitor Cst, that is, a driving current corresponding to the data signal, from the first driving transistor T11 or the second driving transistor T12, and display an image by emitting light of a certain color, and display an image by emitting light of a certain color.

Although FIG. 2 illustrates that the first to ninth transistors T1 to T9 of the pixel circuit PC are P-type transistors, embodiments according to the present disclosure are not limited thereto. Various embodiments are possible so that, for example, the transistors of a pixel circuit may be N-type transistors, or some are P-type transistors and others are N-type transistors.

Figure 3:
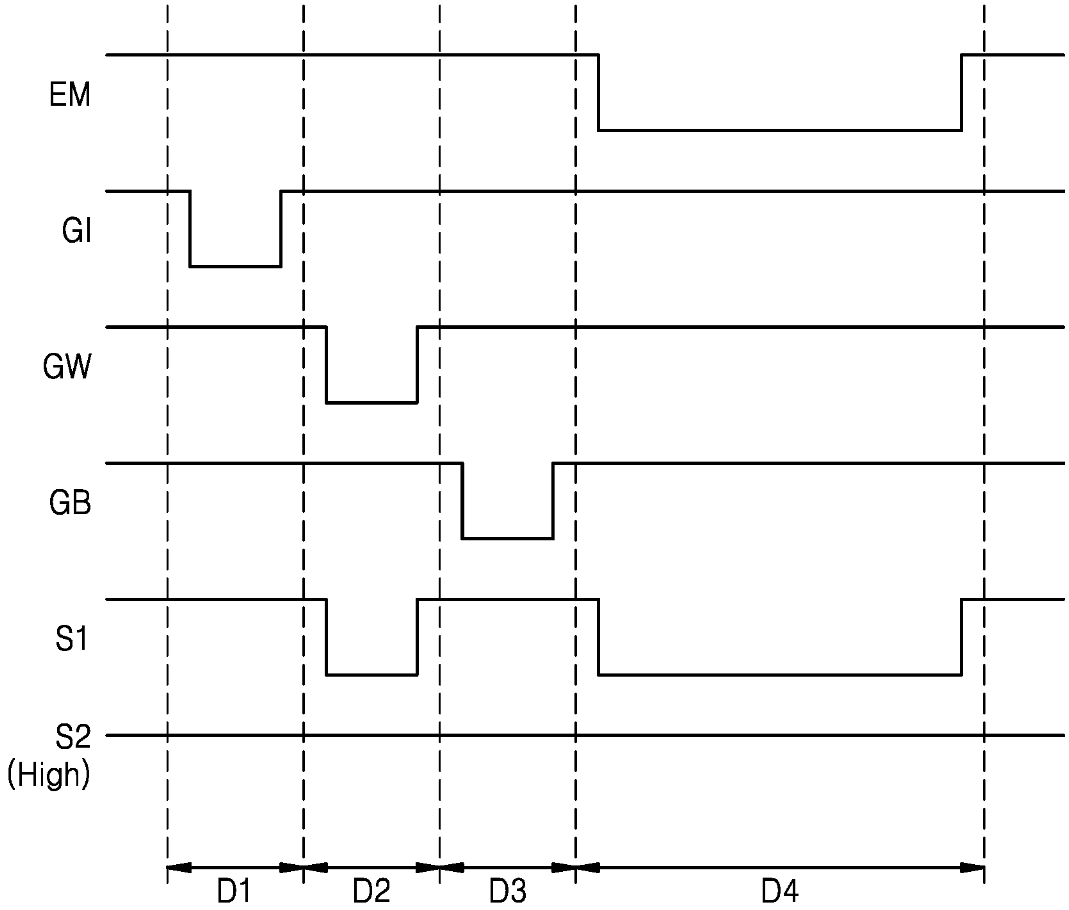
FIGS. 3 and 4 are timing diagrams of control signals to operate the pixel circuit of FIG. 2 according to some embodiments.
Figure 4:
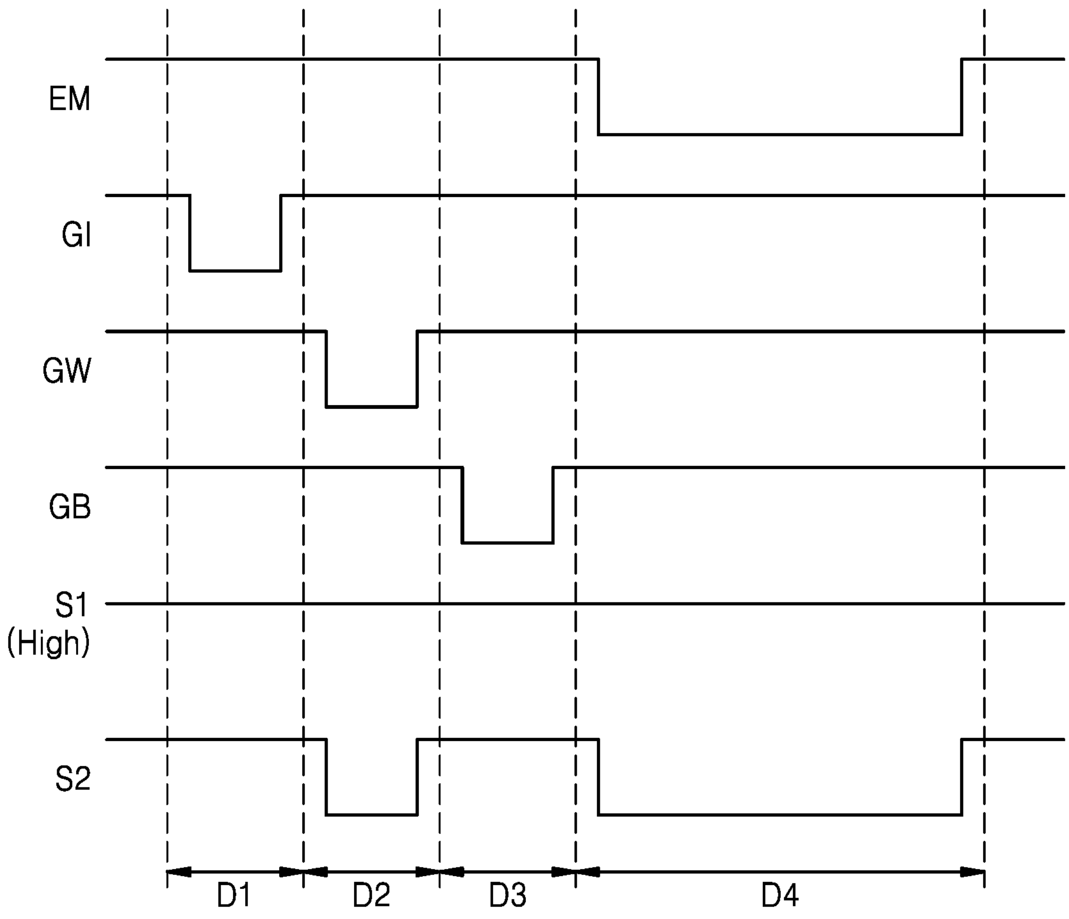

FIGS. 3 and 4 are timing diagrams of the control signals to operate the pixel circuit of FIG. 2. FIG. 3 shows the timing of the control signals in the high brightness mode, and FIG. 4 shows the timing of the control signals in the low brightness mode. The timing of the control signals is described with reference to FIGS. 2 to 4 together.

As shown in FIGS. 3 and 4, one frame may include an emission period and a non-emission period, and the pixel PX may operate as an emission period and a non-emission period during one frame. The non-emission period may include first to third durations D1 to D3. The emission period may include a fourth duration D4. A frame (frame section) may be a duration during which one frame image is displayed. Hereinafter, the ON voltage may be a turn-on voltage of a transistor, and may be a low level voltage. The application of a signal may mean that an ON voltage is applied, and the non-application of a signal may mean that an OFF voltage, for example, a high level voltage, is applied.

A first duration D1 may be a duration during which the gate voltage of a driving transistor is initialized.

The second period D2 may be a duration during which a data write and threshold voltage compensation duration. In the second period D2, a data signal may be supplied to a pixel, and the threshold voltage of a driving transistor may be compensated.

The third duration D3 may be a reset duration. In the third duration D3, a data voltage applied to a pixel may be reset.

The fourth duration D4 may be a duration during which the organic light-emitting diode OLED emits light.

In the high brightness mode, as shown in FIG. 3, in the first duration D1, the second gate signal GI may be applied to the gate of the fourth transistor T4 through the second gate line GIL. Accordingly, the fourth transistor T4 may be turned on, and thus, the second node N2 may be initialized by the initialization voltage Vinit applied through the initialization voltage line VIL.

In the second period D2, the first gate signal GW and the first selection signal S1 may be applied to the pixel PX. The first gate signal GW may be applied to the gate of the second transistor T2 through the first gate line GWL. Accordingly, the second transistor T2 may be turned on, and thus, the data signal DATA applied through the data line DL may be transmitted to the first node N1. Then, the first selection signal S1 may be applied to the gate of the eighth transistor T8 through the first selection line SL1. Accordingly, the eighth transistor T8 may be turned on, and thus, the gate of the first driving transistor T11 may be connected to the second node N2. Then, as the first gate signal GW is applied to the gate of the third transistor T3 through the first gate line GWL, the third transistor T3 may be turned on, and thus, the first driving transistor T11 may be diode-connected. Accordingly, the gate of the first driving transistor T11 may have a data voltage corresponding to the data signal DATA in which the threshold voltage of the first driving transistor T11 is compensated. In the second period D2, as the second selection signal S2 is not applied, the ninth transistor T9 may be turned off.

In the third duration D3, the third gate signal GB may be applied through the third gate line GBL. Accordingly, as the seventh transistor T7 is turned on, the pixel electrode of the organic light-emitting diode OLED may be initialized by the initialization voltage Vinit applied through the initialization voltage line VIL. Accordingly, a capacitor parasitically formed in the organic light-emitting diode OLED is discharged, and thus, the organic light-emitting diode OLED may be initialized.

In the fourth duration D4, the fourth gate signal EM and the first selection signal S1 may be applied to the pixel PX. As the fourth gate signal EM is applied to the gate of the fifth transistor T5 and the gate of the sixth transistor T6 through the fourth gate line EML, the fifth transistor T5 and the sixth transistor T6 may be turned on. Then, as the first selection signal S1 is applied to the gate of the eighth transistor T8 through the first selection line SL1, the eighth transistor T8 may be turned on, and thus, the gate of the first driving transistor T11 may be connected to the second node N2. Accordingly, the first driving transistor T11 may output the driving current corresponding to the gate voltage, and the organic light-emitting diode OLED may emit light at a brightness corresponding to the driving current.

In the low brightness mode, as illustrated in FIG. 4, it is different from the high brightness mode in that the second selection signal S2 is applied to the pixel PX in the second period D2 and the fourth duration D4.

In the second period D2, the first gate signal GW is applied to the gate of the second transistor T2 through the first gate line GWL, and the second selection signal S2 may be applied to the gate of the ninth transistor T9 through the second selection line SL2. Accordingly, the second transistor T2 may be turned on, and thus, the data signal DATA applied through the data line DL may be transmitted to the first node N1. Then, the ninth transistor T9 may be turned on, and thus, the gate of the second driving transistor T12 may be connected to the second node N2. Then, as the first gate signal GW is applied to the gate of the third transistor T3 through the first gate line GWL, the third transistor T3 may be turned on, and thus, the second driving transistor T12 may be diode-connected. Accordingly, the gate of the second driving transistor T12 may have a data voltage corresponding to the data signal DATA in which the threshold voltage of the second driving transistor T12 is compensated. In the second period D2, as the first selection signal S1 is not applied, the eighth transistor T8 may be turned off.

In the fourth duration D4, the fourth gate signal EM is applied to the gate of the fifth transistor T5 and the gate of the sixth transistor T6 through the fourth gate line EML, and thus, the fifth transistor T5 and the sixth transistor T6 may be turned on. Then, as the second selection signal S2 is applied to the gate of the ninth transistor T9 through the second selection line SL2, the ninth transistor T9 may be turned on, and thus, the gate of the second driving transistor T12 may be connected to the second node N2. Accordingly, the second driving transistor T12 may output the driving current corresponding to the gate voltage, and the organic light-emitting diode OLED may emit light at a brightness corresponding to the driving current.

Figure 5A:
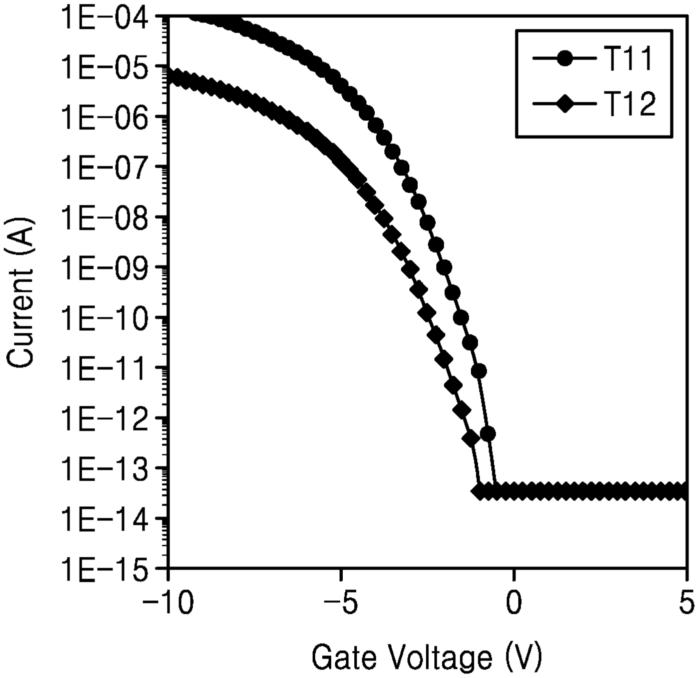
FIG. 5A is a graph showing a gate voltage and a driving current of a driving transistor, according to some embodiments.
Figure 5B:
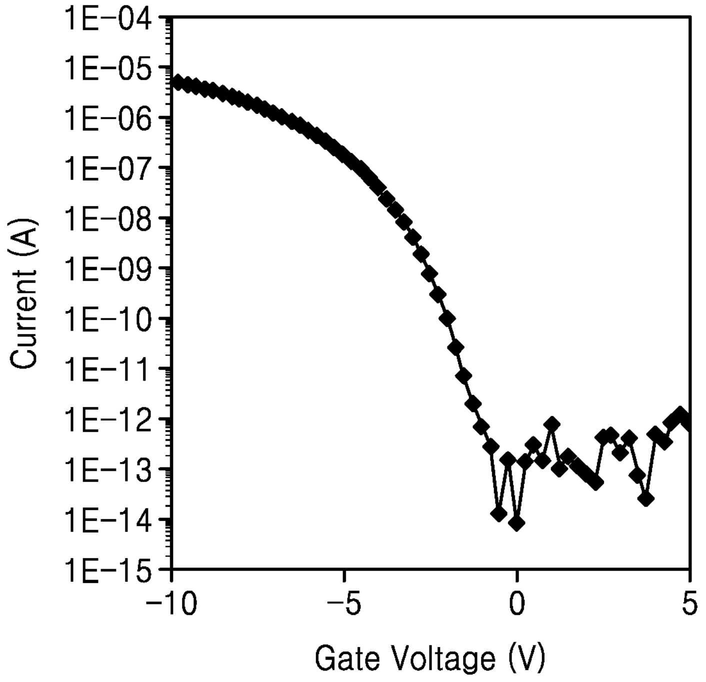
FIG. 5B is a graph showing a gate voltage and a driving current of a driving transistor, according to a comparative example.

FIG. 5A is a graph showing the gate voltage and the driving current of a driving transistor, according to some embodiments. FIG. 5B is a graph showing the gate voltage and the driving current of a driving transistor, according to a comparative example. A comparative example is a case in which a pixel uses a single driving transistor.

FIG. 5B is a graph showing an output current output by a driving transistor in a pixel having only one driving transistor as a comparative example. In a comparative example, when the output current of a driving transistor is increased to display a high brightness image, the voltage of a data signal needs to be increased, which requires an increase in the consumption power of a display apparatus.

In contrast, as shown in FIG. 5A, a pixel according to one or more embodiments may output a high driving current by using the first driving transistor T11 in the high brightness mode, and output a low driving current by using the second driving transistor T12 in the low brightness mode.

Accordingly, as there is no need to increase the voltage of a data signal to display a high brightness image, a low-power circuit configuration may be possible, and thus, the consumption power of a display apparatus may be reduced. Furthermore, in the low brightness mode, as current deviation is reduced compared with the high brightness mode, the Mura phenomenon of an image may be reduced.

Furthermore, it may be checked that the leakage current when the first driving transistor T11 and the second driving transistor T12 are turned off in one or more embodiments may be lower than the leakage current when the driving transistor is turned off in the comparative example.

Figure 6:
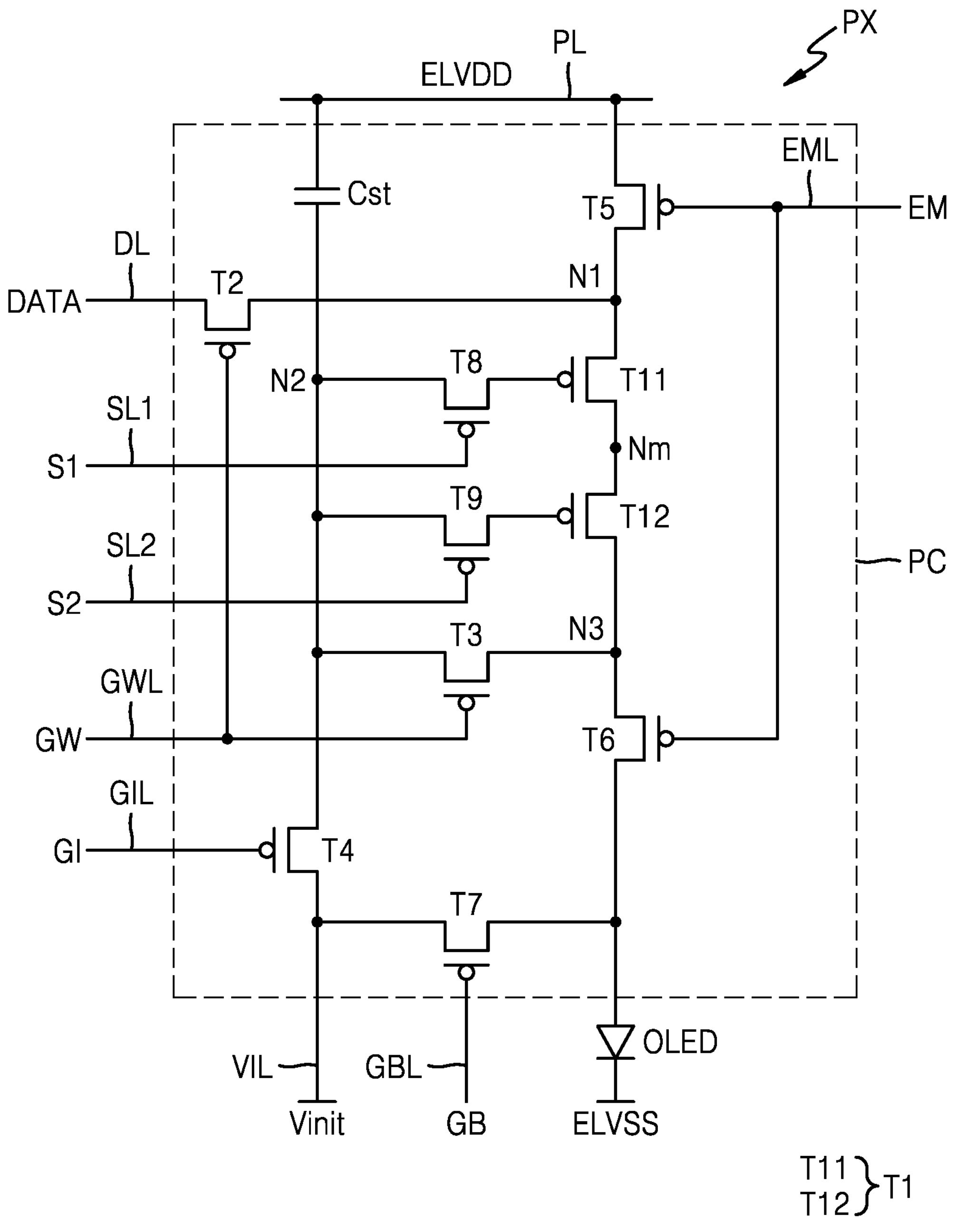
FIG. 6 is a pixel circuit of a pixel according to some embodiments.
Figure 7:
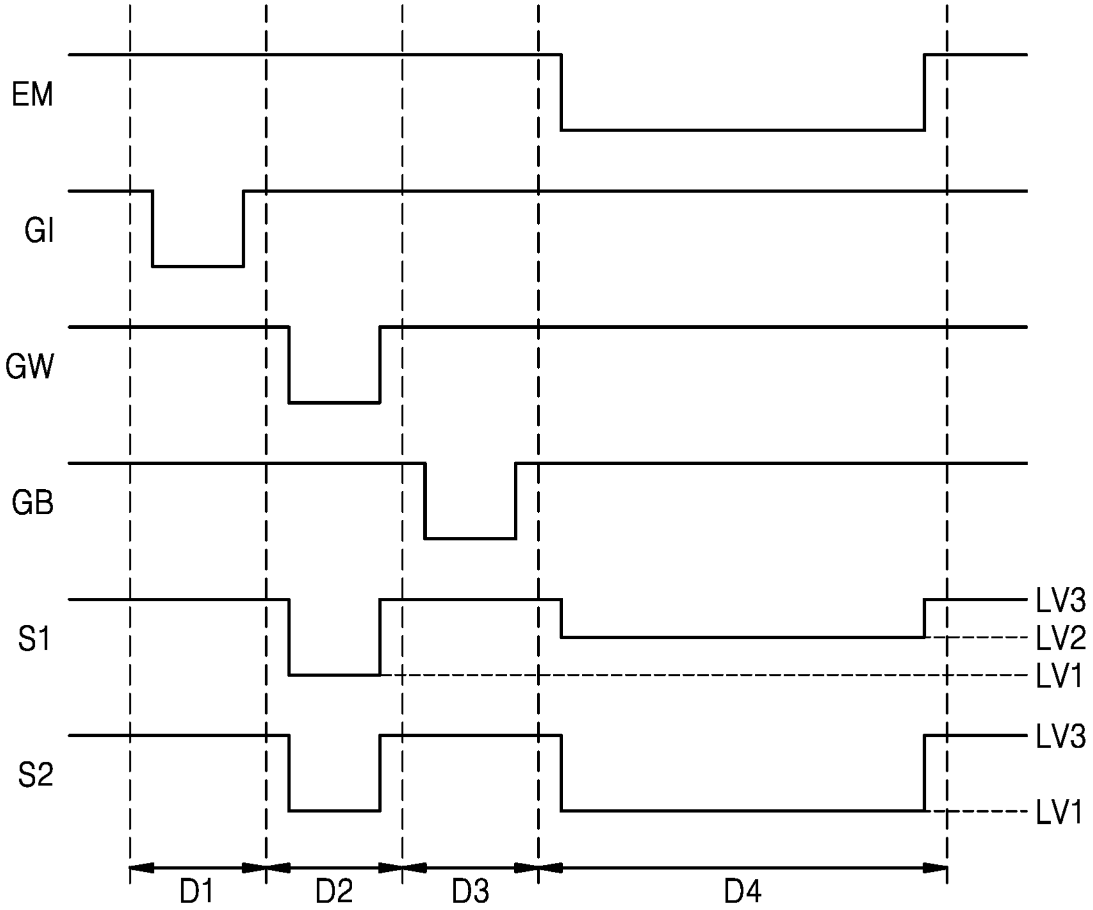
FIGS. 7 and 8 are timing diagrams of control signals to operate the pixel circuit of FIG. 6 according to some embodiments.
Figure 8:
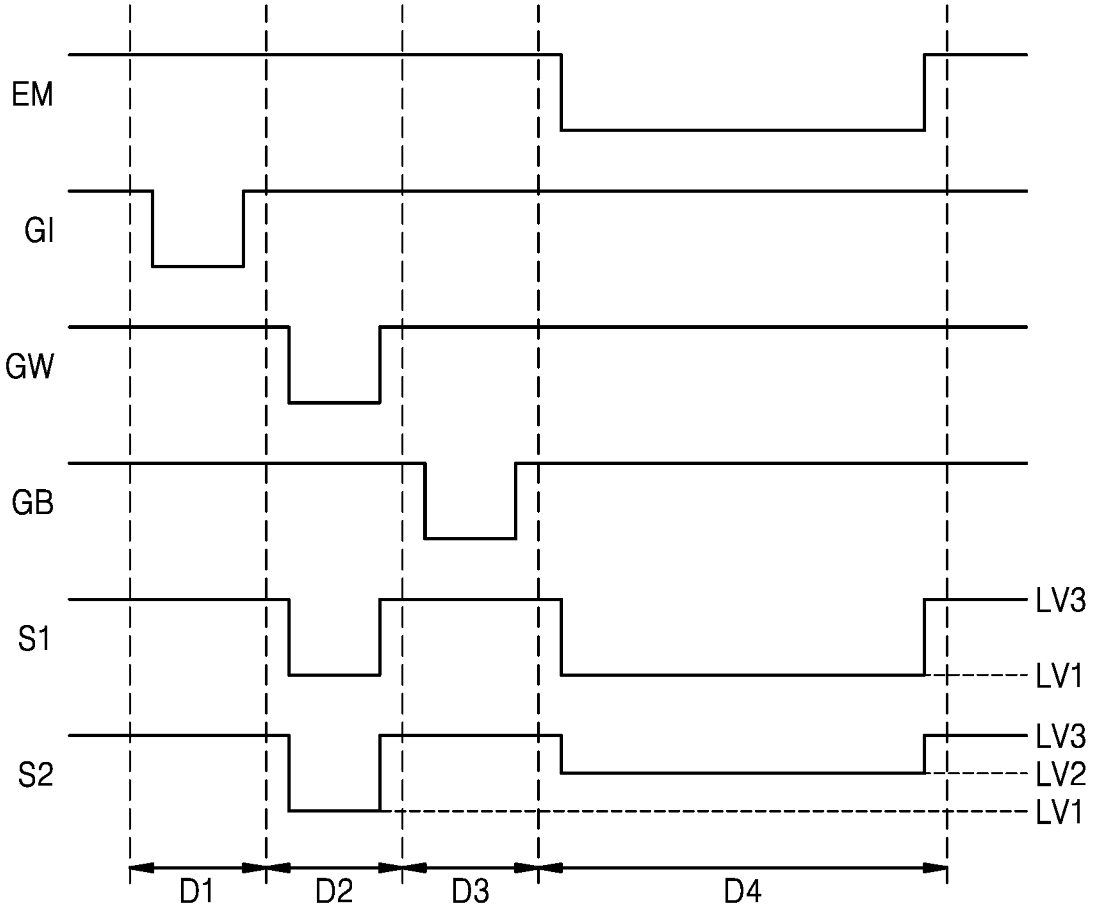

FIG. 6 is a pixel circuit of a pixel according to some embodiments. FIGS. 7 and 8 are timing diagrams of control signals to operate the pixel circuit of FIG. 6. FIG. 7 shows the timing of the control signals in in the high brightness mode, and FIG. 8 shows the timing of the control signals in the low brightness mode. The timing of the control signals is described below with reference to FIGS. 6 to 8 together, and any redundant description with the configuration and operation of the pixel circuit PC of the pixel PX illustrated in FIGS. 2 to 4 is omitted.

Referring to FIG. 6, the pixel PX may include the organic light-emitting diode OLED as a display element and the pixel circuit PC connected to the organic light-emitting diode OLED. The pixel circuit PC may include the first to ninth transistors T1 to T9 and the capacitor C.

The first transistor T1 may be connected between the driving voltage line PL and the organic light-emitting diode OLED. The first transistor T1 may include the first driving transistor T11 and the second driving transistor T12 that are connected in series between the first node N1 and the third node N3.

The first driving transistor T11 may include the first terminal connected to the first node N1 and the second terminal connected to a middle node Nm of the first driving transistor T11 and the second driving transistor T12. The gate of the first driving transistor T11 may be connected to the second node N2 through the eighth transistor T8. The second driving transistor T12 may include the first terminal connected to the middle node Nm and the second terminal connected to the third node N3. The gate of the second driving transistor T12 may be connected to the second node N2 through the ninth transistor T9. The first node N1 may be a node to which the first driving transistor T11 and the fifth transistor T5 are connected. The first node N1 may be a node to which the first terminal of the first driving transistor T11 and the second terminal of the fifth transistor T5 are connected. The third node N3 may be a node to which the second driving transistor T12 and the sixth transistor T6 are connected. The third node N3 may be a node to which the second terminal of the second driving transistor T12 and the first terminal of the sixth transistor T6 are connected. The channel length of the second driving transistor T12 may be greater than the channel length of the first driving transistor T11.

The first terminal of the first driving transistor T11 may be connected to the driving voltage line PL via the fifth transistor T5, and the second terminal of the second driving transistor T12 may be connected to the pixel electrode of the organic light-emitting diode OLED via the sixth transistor T6. Each of the first driving transistor T11 and the second driving transistor T12, in response to the switching operation of the second transistor T2, may receive the data signal DATA and control an amount of current of the driving current flowing in the organic light-emitting diode OLED. In the high brightness mode, the driving current may be output through the first driving transistor T11 having a short channel length. In this state, the second driving transistor T12 may function as a switching transistor by being turned on to transmit a signal. In the low brightness mode, the driving current may be output through the second driving transistor T12 having a long channel length. In this state, the first driving transistor T11 may function as a switching transistor by being turned on to transmit a signal.

The second transistor T2 (data write transistor) may be connected between the data line DL and the first node N1, and connected to the driving voltage line PL via the fifth transistor T5. The second transistor T2 may include the gate connected to the first gate line GWL, the first terminal connected to the data line DL, and the second terminal connected to the first node N1. The second transistor T2 may perform a switching operation of being turned on in response to the first gate signal GW received through the first gate line GWL and transmitting the data signal DATA applied through the data line DL to the first node N1.

The third transistor T3 (compensation transistor) may be connected between the second node N2 and the third node N3. The third transistor T3 may be connected to the organic light-emitting diode OLED via the sixth transistor T6. The third transistor T3 may include the gate connected to the first gate line GWL, the first terminal connected to the second node N2, and the second terminal connected to the third node N3. The second node N2 may be a node to which the gate of the first driving transistor T11 and the gate of the second driving transistor T12 are connected via the eighth transistor T8 and the ninth transistor T9, respectively. The third transistor T3 may be turned on in response to the first gate signal GW received through the first gate line GWL to have the first driving transistor T11 and the second driving transistor T12 be diode-connected, thereby compensating the threshold voltages of the first driving transistor T11 and the second driving transistor T12.

The fourth transistor T4 (first initialization transistor) may be connected between the second node N2 and the initialization voltage line VIL. The fourth transistor T4 may include the gate connected to the second gate line GIL, the first terminal connected to the second node N2, and the second terminal connected to the initialization voltage line VIL. The fourth transistor T4 may be turned on in response to the second gate signal GI received through the second gate line GIL to transmit the initialization voltage Vinit to the gate of the first transistor T1, thereby initializing the gate of the first transistor T1.

The fifth transistor T5 (first emission control transistor) may be connected between the driving voltage line PL and the first node N1. The sixth transistor T6 (second emission control transistor) may be connected between the third node N3 and the organic light-emitting diode OLED. The fifth transistor T5 may include the gate connected to the fourth gate line EML, the first terminal connected to the driving voltage line PL, and the second terminal connected to the first node N1. The sixth transistor T6 may include the gate connected to the fourth gate line EML, the first terminal connected to the third node N3, and the second terminal connected to the pixel electrode of the organic light-emitting diode OLED. The fifth transistor T5 and the sixth transistor T6 may be simultaneously turned on in response to the fourth gate signal EM received through the fourth gate line EML, and thus, the driving current may flow in the organic light-emitting diode OLED.

The seventh transistor T7 (second initialization transistor) may be connected between the organic light-emitting diode OLED and the initialization voltage line VIL. The seventh transistor T7 may include the gate connected to the third gate line GBL, the first terminal connected to the second terminal of the sixth transistor T6 and the pixel electrode of the organic light-emitting diode OLED, and the second terminal connected to the initialization voltage line VIL. The seventh transistor T7 may be turned on in response to the third gate signal GB received through the third gate line GBL to transmit the initialization voltage Vinit to the pixel electrode of the organic light-emitting diode OLED, thereby initializing the pixel electrode of the organic light-emitting diode OLED.

The eighth transistor T8 (first select transistor) may be connected between the gate of the first driving transistor T11 and the second node N2. The eighth transistor T8 may include the gate connected to the first selection line SL1, the first terminal connected to the second node N2, and the second terminal connected to the gate of the first driving transistor T11. The eighth transistor T8 may be turned on in response to the first selection signal S1 received through the first selection line SL1, thereby controlling the turn-on of the first driving transistor T11.

The ninth transistor T9 (second select transistor) may be connected between the gate of the second driving transistor T12 and the second node N2. The ninth transistor T9 may include the gate connected to the second selection line SL2, the first terminal connected to the second node N2, and the second terminal connected to the gate of the second driving transistor T12. The ninth transistor T9 may be turned on in response to the second selection signal S2 received through the second selection line SL2, thereby controlling the turn-on of the second driving transistor T12.

The capacitor Cst may include the first electrode connected to the driving voltage line PL and the second electrode connected to the second node N2. The capacitor Cst may maintain the voltage of the gate of the first transistor T1 by storing and maintaining the voltage corresponding to the difference between the voltages supplied to both ends of the first electrode and the second electrode.

The organic light-emitting diode OLED may include the pixel electrode, for example, an anode, and the counter electrode, for example, a cathode, facing the pixel electrode, and the counter electrode may receive an application of the common voltage ELVSS. The organic light-emitting diode OLED may receive a driving current from the first driving transistor T11 or the second driving transistor T12, and display an image by emitting light of a certain color.

As illustrated in FIGS. 7 and 8, in the first duration D1, the second gate signal GI may be applied to the gate of the fourth transistor T4 through the second gate line GIL. Accordingly, the fourth transistor T4 may be turned on, and thus, the second node N2 may be initialized by the initialization voltage Vinit applied through the initialization voltage line VIL.

In the second period D2, the first gate signal GW, the first selection signal S1, and the second selection signal S2 may be applied to the pixel PX. The first gate signal GW may be applied to the gate of the second transistor T2 through the first gate line GWL. Accordingly, the second transistor T2 may be turned on, and thus, the data signal DATA applied through the data line DL may be transmitted to the first node N1. Then, the first selection signal S1 may be applied to the gate of the eighth transistor T8 through the first selection line SL1. Accordingly, the eighth transistor T8 may be turned on, and thus, the gate of the first driving transistor T11 may be connected to the second node N2. Then, the second selection signal S2 may be applied to the gate of the ninth transistor T9 through the second selection line SL2. Accordingly, the ninth transistor T9 may be turned on, and thus, the gate of the second driving transistor T12 may be connected to the second node N2. Then, as the first gate signal GW is applied to the gate of the third transistor T3 through the first gate line GWL, the third transistor T3 may be turned on, and thus, the first driving transistor T11 and the second driving transistor T12 may be diode-connected. Accordingly, the second node N2 may have a data voltage corresponding to the data signal DATA in which the threshold voltages of the first driving transistor T11 and the second driving transistor T12 are compensated.

In the third duration D3, the third gate signal GB may be applied through the third gate line GBL. Accordingly, as the seventh transistor T7 is turned on, the pixel electrode of the organic light-emitting diode OLED may be initialized by the initialization voltage Vinit applied through the initialization voltage line VIL. Accordingly, a capacitor parasitically formed in the organic light-emitting diode OLED is discharged, and thus, the organic light-emitting diode OLED may be initialized.

In the fourth duration D4, the fourth gate signal EM, the first selection signal S1 and the second selection signal S2 may be applied to the pixel PX. As the fourth gate signal EM is applied to the gate of the fifth transistor T5 and the gate of the sixth transistor T6 through the fourth gate line EML, the fifth transistor T5 and the sixth transistor T6 may be turned on. Then, as the first selection signal S1 is applied to the gate of the eighth transistor T8 through the first selection line SL1, the eighth transistor T8 may be turned on, and thus, the gate of the first driving transistor T11 may be connected to the second node N2. Then, as the second selection signal S2 is applied to the gate of the ninth transistor T9 through the second selection line SL2, the ninth transistor T9 may be turned on, and thus, the gate of the second driving transistor T12 may be connected to the second node N2.

In this state, the first driving transistor T11 and the second driving transistor T12 may function as a driving transistor or a switching transistor by the voltage levels of the first selection signal S1 and the second selection signal S2. According to some embodiments, in the high brightness mode, the first driving transistor T11 may function as a driving transistor, and the second driving transistor T12 may function as a switching transistor. In the low brightness mode, the first driving transistor T11 may function as a switching transistor, the second driving transistor T12 may function as a driving transistor.

As illustrated in FIG. 7, in the high brightness mode, the first selection signal S1 in the fourth duration D4 may have a voltage level to control the turn-on state of the eighth transistor T8 so that a voltage to make the first driving transistor T11 in a turn-on state to output a driving current corresponding to the data signal DATA is applied to the gate of the first driving transistor T11. The second selection signal S2 may have a voltage level to control the turn-on state of the ninth transistor T9 so that a voltage to fully turn on the second driving transistor T12 is applied to the gate of the second driving transistor T12. Accordingly, as the second driving transistor T12 performs a switching function, the output (driving current) of the first driving transistor T11 may be transmitted to the organic light-emitting diode OLED, and thus, the organic light-emitting diode OLED may emit light at a brightness corresponding to the driving current.

As illustrated in FIG. 8, in the low brightness mode, the first selection signal S1 in the fourth duration D4 may have a voltage level to control the turn-on state of the eighth transistor T8 so that a voltage to fully turn on the first driving transistor T11 is applied to the gate of the first driving transistor T11. Accordingly, as the first driving transistor T11 performs a switching function, the output of the fifth transistor T5 may be transmitted to the second driving transistor T12. The second selection signal S2 may have a voltage level to control the turn-on state of the ninth transistor T9 so that a voltage to make the second driving transistor T12 in a turn-on state to output a driving current corresponding to the data signal DATA is applied to the gate of the second driving transistor T12. The organic light-emitting diode OLED may emit light at a brightness corresponding to the driving current that the second driving transistor T12 outputs.

A voltage level LV2 of the first selection signal S1 in the fourth duration D4, in the high brightness mode, and a voltage level LV2 of the second selection signal S2 in the fourth duration D4, in the low brightness mode, may be determined from relationship information of the voltage level LV2 and the driving current corresponding to the data signal DATA that is predefined. According to some embodiments, in the high brightness mode, the voltage level LV2 of the first selection signal S1 in the fourth duration D4 may vary depending on the data signal DATA, and may be in a range of a voltage level LV1 to a voltage level LV3. In the low brightness mode, the voltage level LV2 of the second selection signal S2 in the fourth duration D4 may vary depending on the data signal DATA, and may be in a range of the voltage level LV1 to the voltage level LV3.

Figure 9:
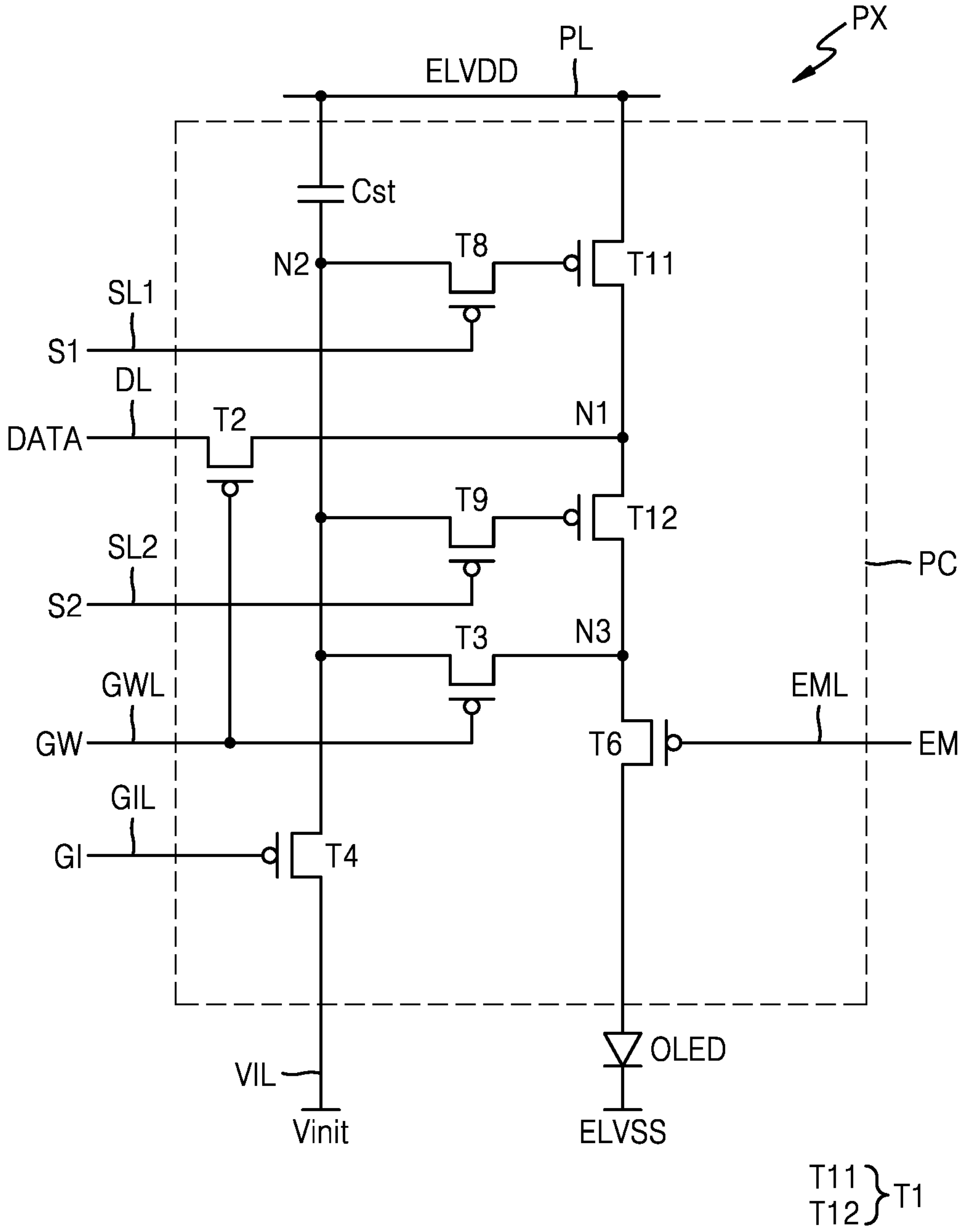
FIG. 9 is a pixel circuit of a pixel according to some embodiments.
Figure 10:
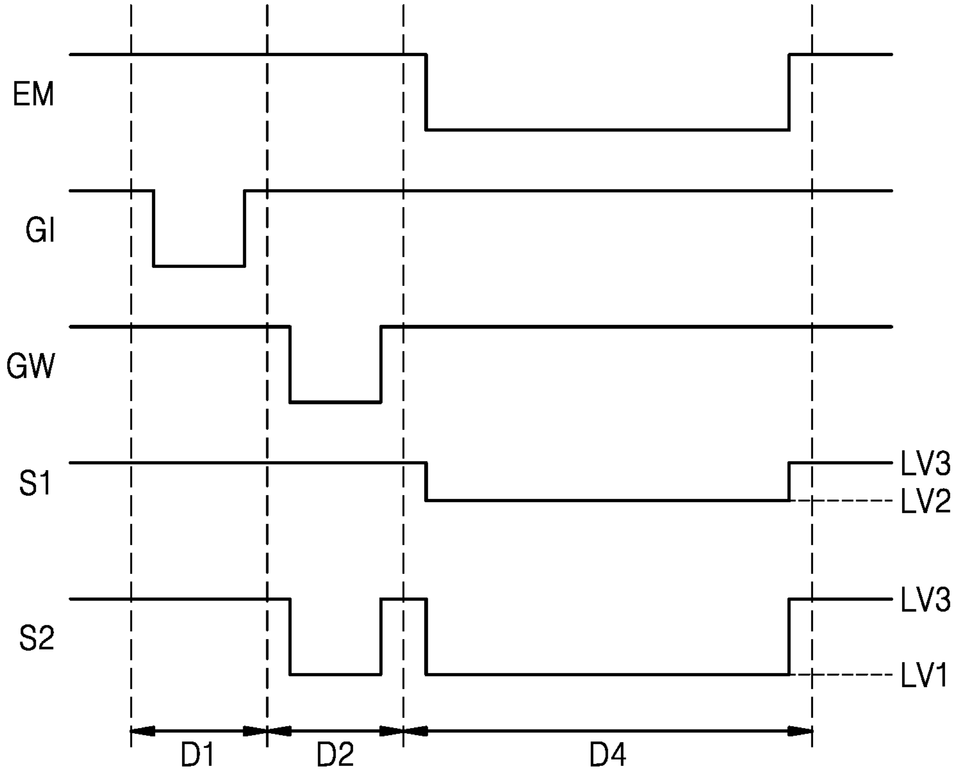
FIGS. 10 and 11 are timing diagrams of control signals to operate the pixel circuit of FIG. 9 according to some embodiments.
Figure 11:
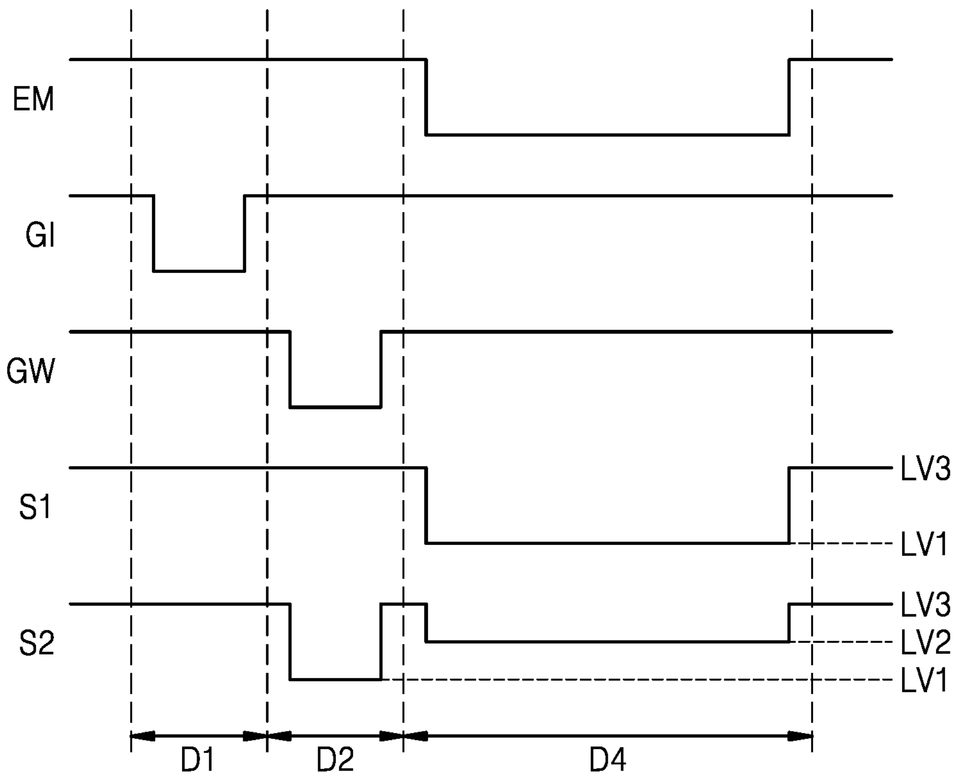

FIG. 9 is a pixel circuit of a pixel according to some embodiments. FIGS. 10 and 11 are timing diagrams of control signals to operate the pixel circuit of FIG. 9. FIG. 10 shows the timing of the control signals in the high brightness mode, and FIG. 11 shows the timing of the control signals in the low brightness mode. The timing of the control signals is described below with reference to FIGS. 9 to 11, and any redundant description with the configuration and operation of the pixel circuit PC of the pixel PX illustrated in FIGS. 2 to 4 is omitted.

Referring to FIG. 9, the pixel PX may include the organic light-emitting diode OLED as a display element and the pixel circuit PC connected to the organic light-emitting diode OLED. The pixel circuit PC may include the first to fourth transistors T1 to T4, the sixth transistor T6, the eighth transistor T8, the ninth transistor T9, and the capacitor C. The pixel circuit PC of FIG. 9 is different from the pixel circuit PC of FIG. 6 in that the fifth transistor T5 and the seventh transistor T7 are omitted, and the first driving transistor T11 is located at the position of the fifth transistor T5.

The first transistor T1 may be connected between the driving voltage line PL and the organic light-emitting diode OLED. The first transistor T1 may include the first driving transistor T11 and the second driving transistor T12 that are connected in series between the driving voltage line PL and the third node N3.

The first driving transistor T11 may include the first terminal connected to the driving voltage line PL and the second terminal connected to the first node N1. The gate of the first driving transistor T11 may be connected to the second node N2 through the eighth transistor T8. The second driving transistor T12 may include the first terminal connected to the first node N1 and the second terminal connected to the third node N3. The gate of the second driving transistor T12 may be connected to the second node N2 through the ninth transistor T9. The first node N1, as a middle node of the first driving transistor T11 and the second driving transistor T12, may be a node to which the first driving transistor T11 and the second driving transistor T12 are connected. The first node N1 may be a node to which the second terminal of the first driving transistor T11 and the first terminal of the second driving transistor T12 are connected. The second terminal of the second driving transistor T12 may be connected to the pixel electrode of the organic light-emitting diode OLED via the sixth transistor T6. The channel length of the second driving transistor T12 may be greater than the channel length of the first driving transistor T11.

In the high brightness mode, the driving current may be output through the first driving transistor T11 having a short channel length. In this state, the second driving transistor T12 may function as a switching transistor that is turned on to transmit a signal. In the low brightness mode, the driving current may be output through the second driving transistor T12 having a long channel length. In this state, the first driving transistor T11 may function as a switching transistor that is turned on to transmit a signal.

The second transistor T2 (data write transistor) may be connected between the data line DL and the first node N1, and connected to the driving voltage line PL via the first driving transistor T11. The second transistor T2 may include the gate connected to the first gate line GWL, the first terminal connected to the data line DL, and the second terminal connected to the first node N1. The second transistor T2 may perform a switching operation of being turned on in response to the first gate signal GW received through the first gate line GWL and transmitting the data signal DATA applied through the data line DL to the first node N1.

The third transistor T3 (compensation transistor) may be connected between the second node N2 and the third node N3. The third transistor T3 may be connected to the organic light-emitting diode OLED via the sixth transistor T6. The third transistor T3 may include the gate connected to the first gate line GWL, the first terminal connected to the second node N2, and the second terminal connected to the third node N3. The third transistor T3 may be turned on in response to the first gate signal GW received through the first gate line GWL to have the second driving transistor T12 be diode-connected, thereby compensating the threshold voltage of the second driving transistor T12.

The fourth transistor T4 (initialization transistor) may be connected between the second node N2 and the initialization voltage line VIL. The fourth transistor T4 may include the gate connected to the second gate line GIL, the first terminal connected to the second node N2, and the second terminal connected to the initialization voltage line VIL. The fourth transistor T4 may be turned on in response to the second gate signal GI received through the second gate line GIL to transmit the initialization voltage Vinit to the gate of the first transistor T1, thereby initializing the gate of the first transistor T1.

The sixth transistor T6 (emission control transistor) may be connected between the third node N3 and the organic light-emitting diode OLED. The sixth transistor T6 may include the gate connected to the fourth gate line EML, the first terminal connected to the third node N3, and the second terminal connected to the pixel electrode of the organic light-emitting diode OLED. The sixth transistor T6 may be turned on in response to the fourth gate signal EM received through the fourth gate line EML, and thus, the driving current may flow in the organic light-emitting diode OLED.

The eighth transistor T8 (first select transistor) may be connected between the gate of the first driving transistor T11 and the second node N2. The eighth transistor T8 may include the gate connected to the first selection line SL1, the first terminal connected to the gate of the first driving transistor T11, and the second terminal connected to the second node N2. The eighth transistor T8 may be turned on in response to the first selection signal S1 received through the first selection line SL1, thereby controlling the turn-on of the first driving transistor T11.

The ninth transistor T9 (second select transistor) may be connected between the gate of the second driving transistor T12 and the second node N2. The ninth transistor T9 may include the gate connected to the second selection line SL2, the first terminal connected to the gate of the second driving transistor T12, and the second terminal connected to the second node N2. The ninth transistor T9 may be turned on in response to the second selection signal S2 received through the second selection line SL2, thereby controlling the turn-on of the second driving transistor T12.

The capacitor Cst may include the first electrode connected to the driving voltage line PL and the second electrode connected to the second node N2. The capacitor Cst may maintain the voltage of the gate of the first transistor T1 by storing and maintaining the voltage corresponding to the difference between the voltages supplied to both ends of the first electrode and the second electrode.

The organic light-emitting diode OLED may include the pixel electrode, for example, an anode, and the counter electrode, for example, a cathode, facing the pixel electrode, and the counter electrode may receive an application of the common voltage ELVSS. The organic light-emitting diode OLED may receive a driving current from the first driving transistor T11 or the second driving transistor T12, and display an image by emitting light of a certain color.

As illustrated in FIGS. 10 and 11, in the first duration D1, the second gate signal GI may be applied to the gate of the fourth transistor T4 through the second gate line GIL. Accordingly, the fourth transistor T4 may be turned on, and thus, the second node N2 may be initialized by the initialization voltage Vinit applied through the initialization voltage line VIL.

In the second period D2, the first gate signal GW and the second selection signal S2 may be applied to the pixel PX. The first gate signal GW may be applied to the gate of the second transistor T2 through the first gate line GWL. Accordingly, the second transistor T2 may be turned on, and thus, the data signal DATA applied through the data line DL may be transmitted to the first node N1. Then, the second selection signal S2 may be applied to the gate of the ninth transistor T9 through the second selection line SL2. Accordingly, the ninth transistor T9 may be turned on, and thus, the gate of the second driving transistor T12 may be connected to the second node N2. Then, as the first gate signal GW is applied to the gate of the third transistor T3 through the first gate line GWL, the third transistor T3 may be turned on, and thus, the second driving transistor T12 may be diode-connected. Accordingly, the second node N2 may have a data voltage corresponding to the data signal DATA in which the threshold voltage of the second driving transistor T12 is compensated.

In the fourth duration D4, the fourth gate signal EM, the first selection signal S1, and the second selection signal S2 may be applied to the pixel PX. As the fourth gate signal EM is applied to the gate of the sixth transistor T6 through the fourth gate line EML, the sixth transistor T6 may be turned on. Then, as the first selection signal S1 is applied to the gate of the eighth transistor T8 through the first selection line SL1, the eighth transistor T8 may be turned on, and thus, the gate of the first driving transistor T11 may be connected to the second node N2. Then, as the second selection signal S2 is applied to the gate of the ninth transistor T9 through the second selection line SL2, the ninth transistor T9 may be turned on, and thus, the gate of the second driving transistor T12 may be connected to the second node N2.

In this state, the first driving transistor T11 and the second driving transistor T12 may function as a driving transistor or a switching transistor by the voltage levels of the first selection signal S1 and the second selection signal S2. According to some embodiments, in the high brightness mode, the first driving transistor T11 may function as a driving transistor, and the second driving transistor T12 may function as a switching transistor. In the low brightness mode, the first driving transistor T11 may function as a switching transistor, and the second driving transistor T12 may function as a driving transistor.

As illustrated in FIG. 10, in the high brightness mode, the first selection signal S1 in the fourth duration D4 may have a voltage level to control the turn-on state of the eighth transistor T8 so that a voltage to make the first driving transistor T11 in a turn-on state to output a driving current corresponding to the data signal DATA is applied to the gate of the first driving transistor T11. The second selection signal S2 may have a voltage level to control the turn-on state of the ninth transistor T9 so that a voltage to fully turn on the second driving transistor T12 is applied to the gate of the second driving transistor T12. Accordingly, as the second driving transistor T12 performs a switching function, the output (driving current) of the first driving transistor T11 may be transmitted to the organic light-emitting diode OLED, and thus, the organic light-emitting diode OLED may emit light at a brightness corresponding to the driving current.

As illustrated in FIG. 11, in the low brightness mode, the first selection signal S1 in the fourth duration D4 may have a voltage level to control the turn-on state of the eighth transistor T8 so that a voltage to fully turn on the first driving transistor T11 is applied to the gate of the first driving transistor T11. Accordingly, as the first driving transistor T11 performs a switching function, the output of the fifth transistor T5 may be transmitted to the second driving transistor T12. The second selection signal S2 may have a voltage level to control the turn-on state of the ninth transistor T9 so that a voltage to make the second driving transistor T12 in a turn-on state to output a driving current corresponding to the data signal DATA is applied to the gate of the second driving transistor T12. The organic light-emitting diode OLED may emit light at a brightness corresponding to the driving current that the second driving transistor T12 outputs.

The voltage level LV2 of the first selection signal S1 in the fourth duration D4, in the high brightness mode, and the voltage level LV2 of the second selection signal S2 in the fourth duration D4, in the low brightness mode, may be determined from the relationship information of the voltage level LV2 and the driving current corresponding to the data signal DATA that is predefined. According to some embodiments, the voltage level LV2 of the first selection signal S1 in the fourth duration D4, in the high brightness mode, may vary depending on the data signal DATA, and may be in a range of the voltage level LV1 to the voltage level LV3. In the low brightness mode, the voltage level LV2 of the second selection signal S2 in the fourth duration D4 may vary depending on the data signal DATA, and may be in a range of the voltage level LV1 to the voltage level LV3.

Figure 12:
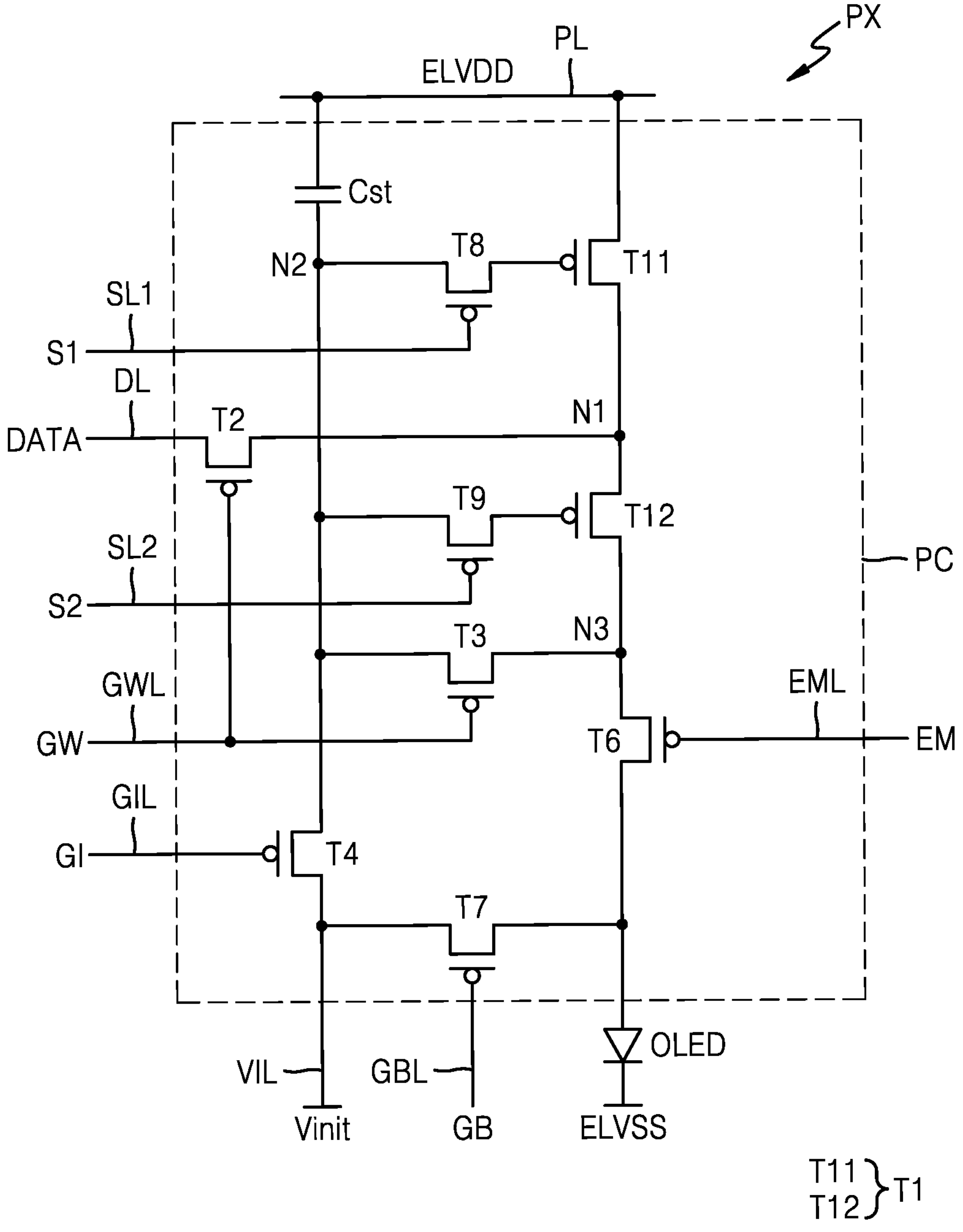
FIG. 12 is a pixel circuit of a pixel according to some embodiments.

FIG. 12 is a pixel circuit of a pixel according to some embodiments. In FIG. 12, the pixel circuit of FIG. 9 further includes the seventh transistor T7. The pixel PX may further include the initialization operation of the organic light-emitting diode OLED in the third duration D3 by the seventh transistor T7 as illustrated in FIGS. 7 and 8.

In the above-described embodiments, the third gate signal GB is applied to the pixel PX in the third duration D3, but this is merely an example. For example, the third gate signal GB may be applied before the first duration D1, or between the first duration D1 and the second period D2.

When the output of a driving transistor is increased to display a high brightness image, the voltage of a data signal needs to be increased, which may increase the consumption power of a display apparatus. According to one or more embodiments, the pixel PX is separately provided with the first driving transistor T11 used for a in a high brightness mode and the second driving transistor T12 used for a low brightness mode, and according to the brightness of an image to be displayed, the organic light-emitting diode OLED may emit light according to the output of the first driving transistor T11 or the output of the second driving transistor T12. In this state, by designing the channel length of the first driving transistor T11 to be shorter than the channel length of the second driving transistor T12, there is no need to increase the voltage of a data signal to increase the output of the first driving transistor T11, and thus, an image may be displayed without increasing the consumption of a display apparatus.

One or more embodiments may include a display apparatus capable of displaying images with relatively high brightness.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, and their equivalents.

What is claimed is:

1. A pixel comprising:

a first transistor comprising a first driving transistor and a second driving transistor;

a second transistor connected between a data line and a first node;

a third transistor connected between a second node and a third node;

a fourth transistor connected between the second node and a first voltage line;

a fifth transistor connected between a second voltage line and the first node;

a sixth transistor connected between the third node and an organic light-emitting diode;

a capacitor connected between the second voltage line and the second node;

a first select transistor connected between a gate of the first driving transistor and the second node; and a second select transistor connected between a gate of the second driving transistor and the second node, wherein the first driving transistor and the second driving transistor of the first transistor are connected in parallel between the first node and the third node, wherein one of the first select transistor and the second select transistor is turned on according to a display mode, the display mode comprising a high brightness display mode and a low brightness display mode.

2. The pixel of claim 1, wherein a channel length of the first driving transistor is less than a channel length of the second driving transistor.

3. The pixel of claim 1, wherein, in the high brightness display mode, in an emission period, the first select transistor is configured to be turned on, and the second select transistor is configured to be turned off.

4. The pixel of claim 1, wherein, in the low brightness display mode, in an emission period, the second select transistor is configured to be turned on, and the first select transistor is configured to be turned off.

5. The pixel of claim 1, wherein one frame comprises a non-emission period and an emission period, the fourth transistor is configured to be turned on in a first duration of the non-emission period, the second transistor and the third transistor are configured to be turned on in a second period subsequent to the first duration of the non-emission period, and the fifth transistor and the sixth transistor are configured to be turned on in the emission period.

6. The pixel of claim 5, wherein the first select transistor is configured to be turned on, or the second select transistor is configured to be turned on in the second period and the emission period, according to a brightness of an image to be displayed.

7. The pixel of claim 5, further comprising a seventh transistor connected between a third voltage line and the organic light-emitting diode, wherein the seventh transistor is configured to be turned on in a third duration of the non-emission period, and the third duration is one of a duration before the first duration, a duration between the first duration and the second period, and a duration between the second period and the emission period.

8. A pixel comprising:

a first transistor comprising a first driving transistor and a second driving transistor;

a second transistor connected between a data line and a first node;

a third transistor connected between a second node and a third node;

a fourth transistor connected between the second node and a first voltage line;

a fifth transistor connected between a second voltage line and the first node;

a sixth transistor connected between the third node and an organic light-emitting diode;

a capacitor connected between the second voltage line and the second node;

a first select transistor connected between a gate of the first driving transistor and the second node; and a second select transistor connected between a gate of the second driving transistor and the second node, wherein the first driving transistor and the second driving transistor of the first transistor are connected in series between the first node and the third node.

9. The pixel of claim 8, wherein a channel length of the first driving transistor is less than a channel length of the second driving transistor.

10. The pixel of claim 8, wherein one frame comprises a non-emission period and an emission period, the fourth transistor is configured to be turned on in a first duration of the non-emission period, the second transistor and the third transistor are configured to be turned on in a second period subsequent to the first duration of the non-emission period, and the fifth transistor and the sixth transistor are configured to be turned on in the emission period.

11. The pixel of claim 10, wherein the first select transistor and the second select transistor are configured to be turned on in the second period and the emission period, and, in the emission period, a voltage level of a first selection signal applied to the gate of the first select transistor is different from a voltage level of a second selection signal applied to the gate of the second select transistor.

12. The pixel of claim 11, wherein, in a high brightness display mode, in the emission period, the second selection signal has a voltage level to apply a voltage to the gate of the second driving transistor, the voltage enabling the second driving transistor to perform a switching function, and the first selection signal has a voltage level to apply a voltage to the gate of the first driving transistor, the voltage enabling the first driving transistor to output a driving current corresponding to a data signal.

13. The pixel of claim 11, wherein, in a low brightness display mode, in the emission period, the first selection signal has a voltage level to apply a voltage to the gate of the first driving transistor, the voltage enabling the first driving transistor to perform a switching function, and the second selection signal has a voltage level to apply a voltage to the gate of the second driving transistor, the voltage enabling the second driving transistor to output a driving current corresponding to a data signal.

14. The pixel of claim 10, further comprising a seventh transistor connected between a third voltage line and the organic light-emitting diode, wherein the seventh transistor is configured to be turned on in a third duration of the non-emission period, and the third duration is one of a duration before the first duration, a duration between the first duration and the second period, and a duration between the second period and the emission period.

15. A pixel comprising:

a first transistor comprising a first driving transistor and a second driving transistor that are connected in series between a first voltage line and a third node;

a second transistor connected between a data line and a first node that is a middle node of the first driving transistor and the second driving transistor;

a third transistor connected between a second node and the third node;

a fourth transistor connected between the second node and a second voltage line;

a fifth transistor connected between the third node and an organic light-emitting diode;

a capacitor connected between the first voltage line and the second node;

a first select transistor connected between a gate of the first driving transistor and the second node; and a second select transistor connected between a gate of the second driving transistor and the second node.

16. The pixel of claim 15, wherein a channel length of the first driving transistor is less than a channel length of the second driving transistor.

17. The pixel of claim 15, wherein one frame comprises a non-emission period and an emission period, the fourth transistor is configured to be turned on in a first duration of the non-emission period, the second transistor and the third transistor are configured to be turned on in a second period subsequent to the first duration of the non-emission period, and the fifth transistor is configured to be turned on in the emission period.

18. The pixel of claim 17, wherein, in the second period, the first select transistor is configured to be turned off and the second select transistor is configured to be turned on, in the emission period, the first select transistor and the second select transistor are configured to be turned on, and in the emission period, a voltage level of a first selection signal applied to the gate of the first select transistor is different from a voltage level of a second selection signal applied to the gate of the second select transistor.

19. The pixel of claim 18, wherein, in a high brightness display mode, in the emission period, the second selection signal has a voltage level to apply a voltage to the gate of the second driving transistor, the voltage enabling the second driving transistor to perform a switching function, and the first selection signal has a voltage level to apply a voltage to the gate of the first driving transistor, the voltage enabling the first driving transistor to output a driving current corresponding to a data signal.

20. The pixel of claim 18, wherein, in a low brightness display mode, in the emission period, the first selection signal has a voltage level to apply a voltage to the gate of the first driving transistor, the voltage enabling the first driving transistor to perform a switching function, and the second selection signal has a voltage level to apply a voltage to the gate of the second driving transistor, the voltage enabling the second driving transistor to output a driving current corresponding to a data signal.

* * * * *